United States Patent [19]
Chung et al.

[11] Patent Number: 5,835,123
[45] Date of Patent: Nov. 10, 1998

[54] DOT ENHANCEMENT FOR LASER IMAGERS

[75] Inventors: Jerry Yeeming Chung, Meridian; Warangkana Tepmongkol, Boise, both of Id.

[73] Assignee: Hewlett-Packard Company, Palo Alto, Calif.

[21] Appl. No.: 563,780

[22] Filed: Nov. 27, 1995

[51] Int. Cl.$^6$ ............................................. B41J 2/47
[52] U.S. Cl. ........................... 347/251; 358/298; 395/109
[58] Field of Search .................................. 347/131, 252, 347/251, 240; 358/459, 298, 296, 300, 302; 395/101, 107, 109

[56] References Cited

U.S. PATENT DOCUMENTS 5,519,426  5/1996  Lukis et al. ............................. 347/211
5,581,292  12/1996  Cianciosi et al. ....................... 347/252

Primary Examiner—Mark J. Reinhart

[57] ABSTRACT

Compensation for pixel aberrations in a laser printer is accomplished by selecting pixels to be augmented, and providing additional optical energy to the selected pixels. In one embodiment, the pixels are selected by selecting pixels in combinations in which required pixel augmentation is indicated. The additional optical energy may be applied at the sub-pixel level so that a threshold of energy depletion on an optical photoreceptor (OPR) is not reached where image development would occur. The energy applied at the sub-pixel level results in enhancement of the selected pixels at an adjacent pixel location.

16 Claims, 6 Drawing Sheets

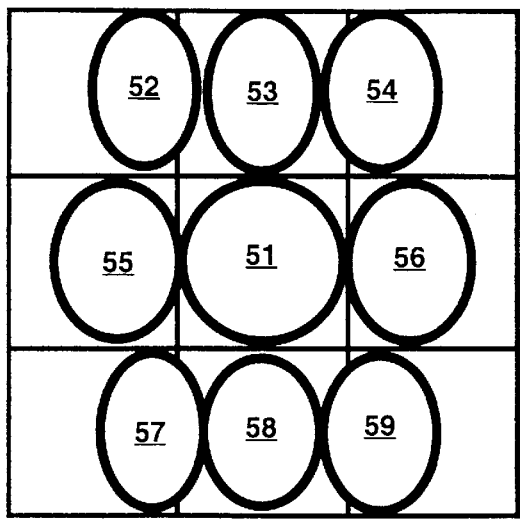
FIG. 6
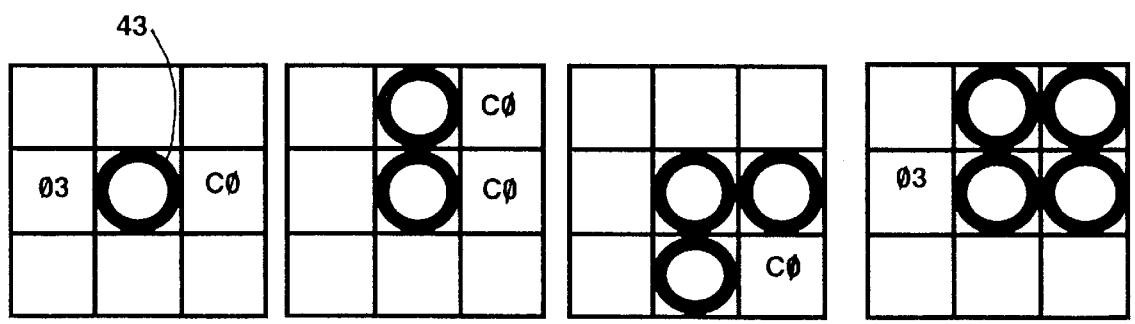
FIG. 7A  FIG. 7B  FIG. 7C  FIG. 7D

DOT ENHANCEMENT FOR LASER IMAGERS

CROSS-REFERENCE TO RELATED APPLICATION

This application shares common subject matter with U.S. patent application Ser. No. 08/563,781 for Adjustment of Dot Size for Laser Imagers, commonly assigned, and filed on the same date herewith.

FIELD OF THE INVENTION

This invention relates to an electrophotographic image forming apparatus, such as used on laser printers. More particularly, the invention relates to controlling the application of optical or other energy in order to enhance the quality of an image formed on such electrophotographic equipment.

BACKGROUND OF THE INVENTION

In electrophotographic printing, a pattern of electrostatic charges corresponding to a print image is developed on an optical photoreceptor (OPR). Toner is applied to the OPR and that toner which is retained as a result of not being repelled by electrostatic charges is used to form the print image. The print image is then transferred to a print media (usually paper).

The OPR may work with either visible spectrum light or optical energy outside the visible light spectrum. In the preferred embodiment, it is anticipated that near infrared laser light will be used, but the OPR as described in connection with this invention is intended to mean any photoreceptor which responds to radiated energy.

A laser printer such as the assignee's LaserJet™ 5L printer creates a printed image by causing a laser light source to scan across the charged surface of photosensitive material on an optical photoreceptor (OPR) in a secession of scan lines. Each scan line is divided into pixel areas and the laser beam is modulated such that selected pixel areas are exposed to light. The exposure to light results in the depletion of surface charges. The exposure of the OPR to the light thereby discharges the OPR at that location and results in the OPR developing toner and then transferring the toner to a corresponding location on the print media (usually a sheet of paper).

The OPR is usually a continuous surface such as a drum or belt, and is used repeatedly for sequential print operations. The toner applied to the OPR during each print operation and developed in the pattern of the print image, before transfer of the print image from the OPR.

At locations where the OPR charge is depleted (by the laser light), toner particles from the emulsion are concentrated, thereby creating the image. At locations on the OPR which are charged, toner particles are not retained by the OPR (the non-image area). This makes the laser printer particularly adaptable to a rasterized print pattern, although it is possible to configure a laser printer for other types of scan techniques.

Printer resolution is partially a function of the size of the optical image which is generated by the laser or optics. The present invention is directed to enhancements of the optical image.

In a typical laser printer application, the optical output from the laser is reflected by a rotating mirror, through a lens, against a stationary mirror, and then onto the OPR. The rotating mirror causes the light to be directed across the width of the OPR, so that the image is scanned onto the OPR.

The scan across the width of the OPR results in a line trace across the OPR, which is conventionally referred to as the horizontal direction, and the rotation of the OPR results in movement of the image about the circumference of the roller, which is conventionally referred to as the vertical direction. (In practice, the scan line is slightly skewed from parallel to the axis of the OPR, which synchronizes the scan with the rotational movement of the OPR to effect a horizontal line trace.)

This scanned image is generated in pixel dots, which provides high resolution for various images, such as text, line drawings and graphics. Halftone images are accomplished by depleting a selected percentage of pixels. The use of a pixelated image permits the generation of a high definition image with high predictability.

As with any lens system, the arrangement of a lens to project an image on the straight surface of the OPR is a compromise. The focal length of the image near the center of the OPR is different from the focal length near the edges. In order to minimize these effects, previous lens designs have established a relatively long focal length which enabled the lens to focus the laser output relatively evenly across the width of the OPR. If the focal length is reduced, the image near the edges tends to spread across the width of the OPR or the image near the center tends to narrow. This results in pixel distortion.

The pixel distortion results in variations in the density of a halftone image across the width of the paper (or other media). That is caused in part by the fact that, if charges on an area of the OPR are depleted, toner will be transferred from that area. The toner is generally transferred as an opaque or developed dot, so if the dot is narrowed, the image appears less dark, and in fact the dot is smaller. Conversely, so long as a threshold of energy is achieved, an expanded dot will appear darker, since it is developed over a larger area.

The optical energy is typically applied at a pre-selected level. This level is sufficient for optical energy to deplete the charge on the OPR sufficient to print a pixel where the scanned laser has the widest spread (typically the edges of the OPR). The optical energy level must be limited in order to limit the maximum spread of the depleted region on the OPR. Therefore, the energy level of the optical transmission (the laser energy) is selected as a compromise. Some compensation for variation in optical energy levels can be accomplished by optical coatings, which may be applied to a flat mirror, a lens or other optical element.

There are cases where isolated pixels are developed. This occurs mostly when "halftone" images are produced. Halftone images are used to produce light shades of grey or another color and typically consist of development of a selected proportion of pixels in a given area. In other words, one pixel is developed (by depleting the charge of the OPR), while adjacent pixels are not developed (by not depleting the charge of the OPR).

It has also been found that isolated developed pixels tend to "wash out" or diminish in intensity. This is because the amount of laser energy required to deplete a region on the OPR is greater when the surrounding area remains charged. In this manner, a developed pixel adjacent one or more developed pixels would be larger than a developed pixel surrounded with uninked pixels. The washout effect is sensitive to the position of the pixel on the OPR because isolated pixels tend to be more sensitive to the effects of variation the shape of the projected laser image across the OPR. In addition, if the energy intensity is ideal for providing even development for solid developed areas across the width of the OPR, this may not be ideal for even development of isolated pixels such as would occur in halftone images.

Shortening of the focal length of optics used to generate a scan pattern across the OPR reduces cost by reducing the size of the engine (the physical printer mechanism) and of component parts. One effect of shortening the focal length is an increased variation of the shape of the laser beam as applied across the OPR. If the beam at the center of the OPR establishes a round dot, then there is a tendency for the beam to spread in width near the edges of the OPR. If the beam is made to be rounded near the edge, then the beam near the center tends to be narrowed. Regardless of the shape, if the beam has sufficient energy to deplete charges on the OPR, the development of the spot tends to follow the shape of the beam, so that a wide beam tends to generate darker patterns, particularly when halftone imaging is applied.

In the case of the image spreading near the edges of the OPR, the result is reduced peak energy levels, which could result in less than optimal image darkness. This effect is particularly prevalent in halftone images, where adjacent pixels are not energized.

Hewlett-Packard Company, the assignee of this patent, has developed a technique for enhancing images for hardcopy devices which produce pixelated images. The technique includes matching a bit map of an image to be printed with predetermined stored templates or patterns to detect occurrence of preselected bit map features. When a match occurs, a compensated pattern is generated, which results in print enhancement. This technique is described in U.S. Pat. No. 4,847,641, to Charles Chen-Yuan Tung, and commonly assigned. One result of the technique is an ability to change the size of pixels along the edges of diagonal lines in order to reduce the jagged edges of these lines.

A particular advantage of the techniques described in U.S. Pat. No. 4,847,641 is that the data processing to provide an enhanced image is, "pipelined," meaning that the modification occurs continuously as the image is output to the laser or other image generator. The delay inherent in the additional signal processing is limited to the delay of processing any one group of images, usually one scan line, with five scan lines entered into a buffer. As the image progresses, no additional delay is encountered, since the additional data processing normally does not slow the rate at which data is read from the bit map or transmitted to the image generator.

The buffer is a FIFO memory in which a plurality of scan lines are stored. In the preferred embodiment, the storage is dynamic or static semiconductor storage, in which five scan lines are stored.

It is an object of the present invention to enhance resolution of a printed image on an electrophotographic printer. It is a further object to provide an electrophotographic printer which has high resolution at a lower cost. It is further desirable to use the ability to provide enhanced resolution in an electrophotographic printer which uses pixelated images in order to simplify the optics of the printer.

It is an object of the invention to use an image generator, such as a laser, which is capable of providing a smaller dot size output to reduce the complexity of optics used to scan an OPR with the image generator. This reduces the complexity of an electrophotographic printer for a given resolution, while maintaining uniformity of the image.

It is an object of the present invention to enhance the uniformity of imaging across the OPR of an electrophotographic printer. This allows enhanced resolution and permits simplifying the optics used to generate the image.

It is desirable to increase uniformity by electronically controlling the energy. It is further desirable to increase uniformity of the image in a manner which does not require a significant increase in maintenance, and which preferably reduces the requirement for adjustments.

SUMMARY OF THE INVENTION

According to the invention, a bit mapped image is evaluated by comparing adjacent or nearby pixels. In the case of a pixel pattern which would provide a weak image as a result of pixels near a selected energized pixel not being energized, additional energy is applied. In a preferred embodiment, the additional energy is applied at reduced levels closely adjacent the selected pixel, but below a predetermined threshold of energy. The threshold is preferably less than that which would generate imaging on adjacent pixels, but sufficient to enhance the imaging on the selected pixel. This is particularly useful in a laser printer, in which high resolution halftone images require pixel enhancement at some locations. This further allows the laser energy to be optimized for providing sharp images under some circumstances, such as type font (text) or line drawings, while compensating for variations in development which would otherwise occur with halftone images.

According to a further aspect of the invention, a bit mapped image is evaluated by searching for blocks of pixels in the bit map which have an imaged center pixel, surrounded by non-imaged pixels. If the center pixel is surrounded by a predetermined number of non-imaged pixels, the additional energy is applied.

BRIEF DESCRIPTION OF THE DRAWINGS

FIG. 6 shows pixelation pattern corresponding to the pulses shown in FIG. 5.

FIGS. 7A–D show an anticipated set of enhancements which are made for different dot patterns;

DETAILED DESCRIPTION OF THE PREFERRED EMBODIMENTS

Figure 1A:
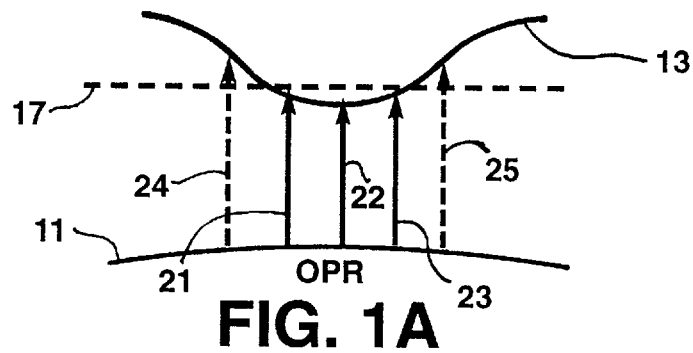
FIGS. 1A and 1B graphically show charge levels across a pixel, in terms of linear distance (abscissa) verses charge levels (ordinate)
Figure 1B:
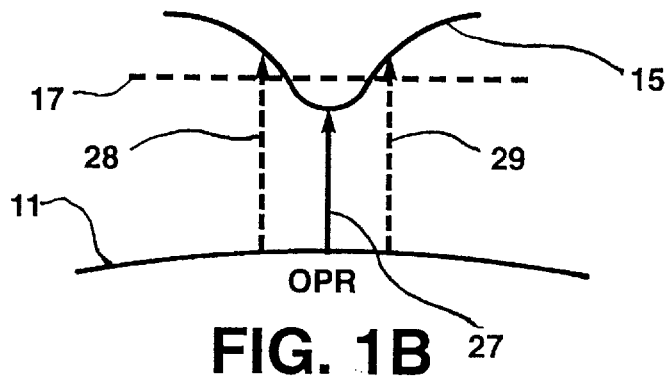

FIGS. 1A and 1B show the energy levels applied by the charged surface of photosensitive material on an optical photoreceptor (OPR) in a single pixel of a scan line after a laser light source was scanned across the OPR. The charge energy decreases gradually toward a center location of the pixel. This charge energy level corresponds inversely to the optical charge levels of the laser light, but tapers off gradually toward the center of the pixel. The reduced charge level corresponds to the ability of the OPR to retain toner particles.

In FIGS. 1A and 1B, the OPR 11 has varied charge levels, represented by lines 13 and 15. If the charge levels are sufficiently depleted, toner is attracted to the OPR 11. This level of depletion required for imaging is represented by dashed line 17 and represents a threshold beyond which image development does not occur. The depletion of the charge to this reduced level is represented by solid arrows 21–23 and 27, where the charge level falls below dashed line 17. In these regions (at solid arrows 21–23 and 27) toner is attracted to the OPR 11. Regions where the charge levels are less depleted, represented by dashed arrows 24–25 and 28–29 do not attract toner. This toner is the image to be printed, which is then transferred to print media (not shown) as a printed image. The charge levels vary; the laser printer described in U.S. Pat. No. 4,847,641 (cited above) charged the OPR to negative 600 volts. In that example, imaging occurred when the OPR was discharged to approximately negative 100 volts.

Referring to FIG. 1A, the charge is sufficiently depleted near the center of the pixel, as represented by solid arrows 21–23, to attract toner. The charge is the most depleted at the center of the pixel, corresponding to line 22, and remains low enough to allow the OPR 11 to attract particles adjacent the center, corresponding to arrows 21 and 23. The charge continues to increases with distance from either side of the center of the pixel, corresponding to dashed arrows 24–25.

In this example, there is no discharged region evident corresponding to an adjacent pixel. If an adjacent pixel were discharged, then the regions which are sufficiently depleted to attract toner particles would overlap. FIG. 1B shows charge sufficiently depleted at the center of the pixel, represented by solid arrow 27, to attract toner. Charge tapers off more sharply than in FIG. 1A, so adjacent regions, as represented by dashed arrows 28–29, are not sufficiently discharged to attract toner. If the toner attraction pattern of FIG. 1A is assumed ideal, then the toner attraction pattern of FIG. 1B is more narrow than the ideal.

If the pattern of depletion across a pixel is sufficient to result in development which extends across a desired boundary of the pixel, and not beyond, except to fill in the space between adjacent depleted pixels, the pixel is properly imaged. If this is not the case, the pixel is considered to have charge irregularities.

Figure 2:
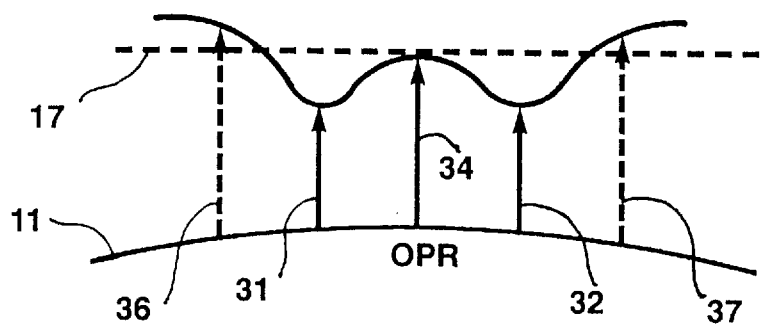
FIG. 2 graphically shows charge levels across two adjacent pixels.

It has been found that adjacent discharged regions tend to become cumulative in their boundary regions. This is because, with a reduced charge level adjacent, the change in electrical charge on the OPR 11 is less when adjacent regions are also discharged. In this manner, adjacent discharged regions "assist" each other by allowing the charge levels to be reduced further from the most depleted region of the pixel. This is shown in FIG. 2, where adjacent pixels are identified by adjacent regions of depletion which appear at solid arrows 31 and 32. The intermediate region, corresponding to solid arrow 34 remains able to attract toner, which results in a solid toner area. Where adjacent pixels are not imaged, charge increases beyond the threshold level of depletion 17 beyond which imaging does not occur, as indicated at dashed arrows 36 and 37.

As can be seen, the result is that toner tends to "bleed" between adjacent pixels which are discharged as seen at arrow 34. This facilitates producing solid developed areas while producing sharp borders to the solid areas. In the case of halftone images, pixels are isolated, resulting in reduced toner coverage. In the extreme, if the depletion level of the pixel is insufficient, the pixel may "wash out" as a result of toner not being attracted to the OPR 11. In addition, the ability to generate uniform toner application is dependent on the pixels being substantially the same size across a scan pattern of the OPR 11.

Figure 3:
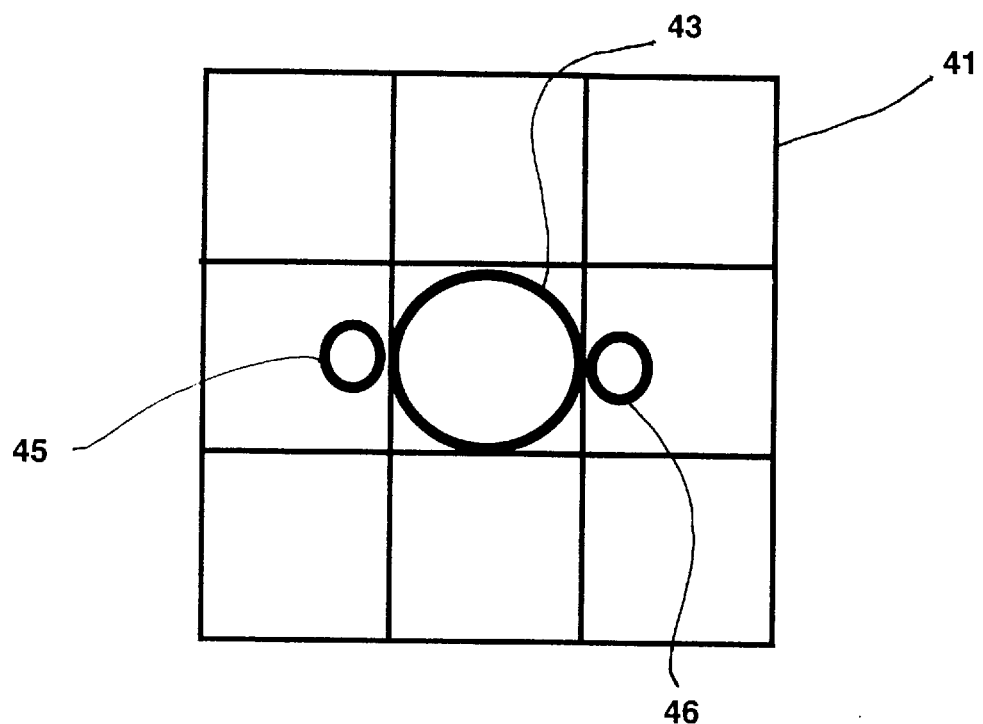
FIG. 3 shows a portion of a raster pattern with a 3×3 window of pixels is represented.

Wash out can be compensated for by selecting pixels which are most subject to charge irregularities. Referring to FIG. 3, this is accomplished by comparing a window, shown as cross-hatched region 41, for each pixel 43 to known pixel patterns. If the pixel 43 fits a pattern which would result in a charge irregularity, the charge pattern is adjusted accordingly.

The process of comparing pixels to known pixel patterns is known as Resolution Enhancement Technology™ (trademark of Hewlett-Packard Company) and is described in U.S. Pat. No. 4,847,641. Circuitry which implements Resolution Enhancement™ technology is incorporated the assignee's Hewlett-Packard LaserJet™ 5L printer, as well as other LaserJet™ printers.

In the case of the present invention, this comparison is used to compensate for the charge irregularities. The techniques of U.S. Pat. No. 4,847,641 have been found particularly useful in providing this comparison.

The signal processing is accomplished with data which is stored in a buffer. The buffer is a FIFO memory in which a plurality of scan lines are stored. In the preferred embodiment, the storage is dynamic or static semiconductor storage, in which five scan lines are stored, although only 3×3 windows are compared within the buffer.

The comparison is accomplished by a logic matching circuit for each pixel which is to be developed by comparing a window having that pixel in the center with predetermined patterns. If the pattern is of that pixel being sufficiently isolated to result in less than sufficient toner coverage, the pixel is expanded. FIG. 3 shows the pixel 43 as isolated. Accordingly, additional optical energy is applied adjacent to the pixel 43, as represented by smaller circles 45 and 46. This results in additional depletion adjacent to the pixel in those areas (circles 45 and 46). This in turn results in an increase in the area covered by toner at that pixel 43. Each specific printer configuration is different because of such things as different optics designs, so the patterns are established accordingly.

The additional depletion typically is not sufficient to allow attraction of toner to the OPR. In appropriate cases sufficient depletion to result in some toner attraction independently of the adjacent pixel 43 is applied. Ordinarily, however, the additional depletion is a sub-pixel exposure and is less than a threshold for development. Therefore, no extra dot will be ordinarily be developed from the additional depletion.

Figure 4:
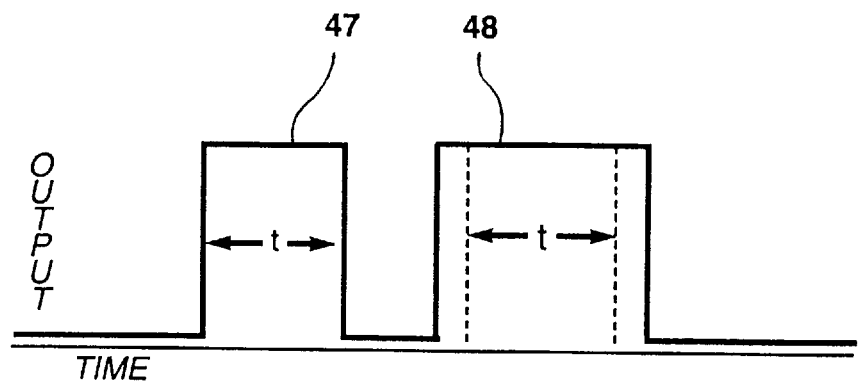
FIG. 4 graphically shows turn on times for a single pixel.

There are several ways to increase the optical energy levels adjacent a pixel. One technique is to simply extend the time duration of the energy applied to the optical element (the laser) as desired. In this manner, the energy level is established by period of time the laser is turned on, rather than the power output of the laser. FIG. 4 shows a baseline time duration t for turn on time for a single pixel, at 47, and the time duration as extended, at 48. Typically, the time duration is extended in increments of ⅛ of the baseline time duration. The ⅛ increments are chosen because this permits changes to the left and right directions to be encoded into eight bits.

Figure 5:
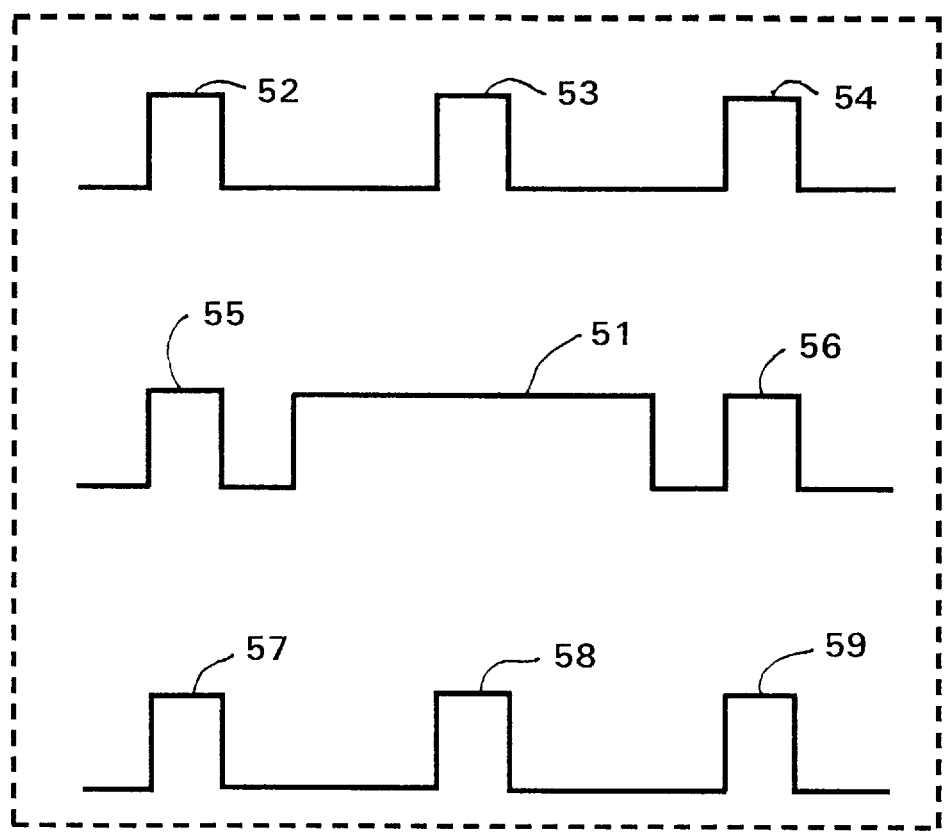
FIG. 5 shows relationships of pulses applied to a laser in order to control development of the pixel.

FIGS. 5 and 6 show the possibility of applying short duration energy pulses to areas surrounding a pixel for the purpose of enhancing that pixel. FIG. 5 shows the relationships of pulses. The enhancement is accomplished by applying short pulses to each adjacent pixel, resulting in the pixelation pattern shown in FIG. 6. In FIGS. 5 and 6, the selected center pixel 50 is surrounded by pixels 51–59, which are energized for short time periods. The short time periods are insufficient to result in enough depletion to create an image, but the depletion of these areas allows the imaging of pixel 50 to expand outwardly. While it is likely that this much enhancement is excessive, it is possible to selectively energize regions in order to provide an improved image pattern.

FIGS. 7A–D show an anticipated set of enhancements which are made for each of four dot patterns. A single isolated pixel 43 is enhanced by adding ¼ pulse length to the undeveloped pixels 45, 46 on either side, as represented by hexadecimal Ø3 and CØ. The pattern of FIG. 7A corresponds to the pattern of FIG. 3. In FIG. 7B, two developed pixels are enhanced by adding ⅛ pulse length on the left at adjacent pixels, represented by hexadecimals CØ. FIG. 7C shows a single ⅛ enhancement on the left side of the enshrouded pixel. FIG. 7D shows an ⅛ enhancements on the right side of one of the pixels to the left of the colored pixels.

In most cases, the depletion of ⅛ or ¼ the normal pixel pulse length would not be sufficient to allow attraction of toner to the OPR if no adjacent pixels are depleted. The additional depletion is ordinarily a sub-pixel exposure and is less than a threshold for development. When an adjacent region is depleted, such as pixel 43, with a pulse length of optical energy which is of longer length, the combination of the short pulse length and the longer length increases the toner attraction.

In selecting the areas for enhancement, consideration is taken for the anticipated shape of the individual pixel. With ideal optics, the shape of a pixel is round. If the optics are not ideal, the shapes of the pixels change across the scan line of a printer. Thus, if a pixel near the edge of a scan line tends to be shorter, it is possible to expand the pixel by applying additional energy above and below the pixel. Likewise, narrow pixels can be increased in width by either extending the duration of turn on time of the laser or by adding short pulses adjacent the pixel. This is also useful if the pixel is slightly out of focus, and therefore the OPR requires additional optical energy at adjacent locations to reach a threshold depletion over a desired area.

Figure 8:
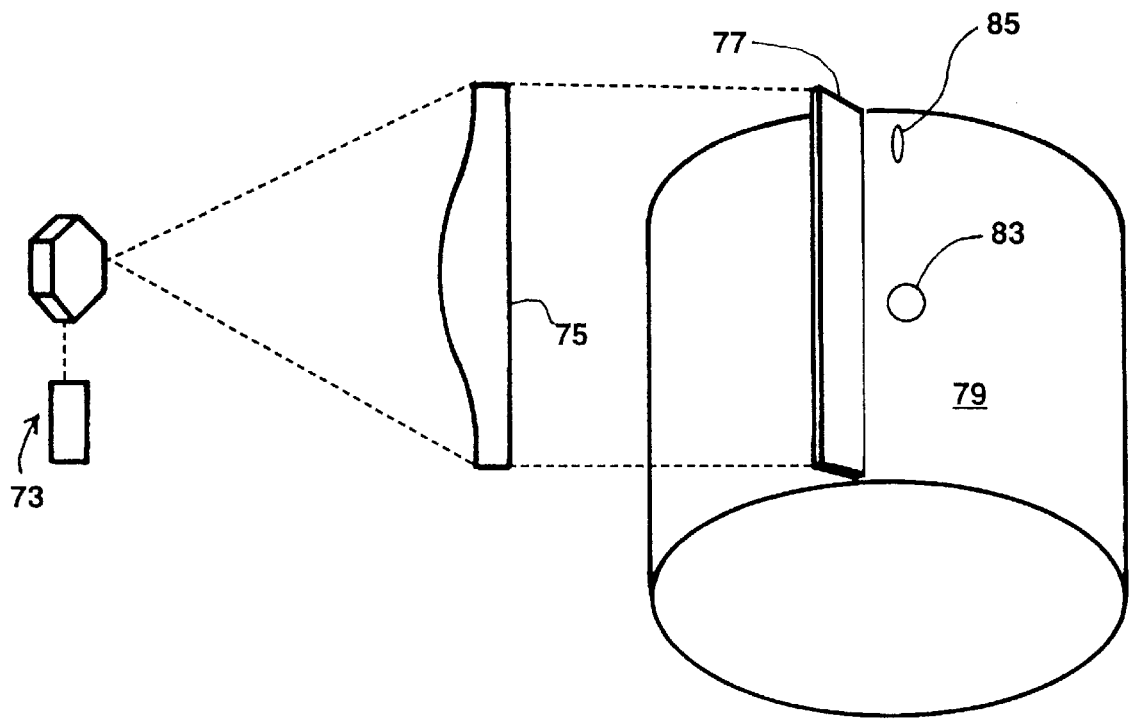
FIG. 8 shows an optics configuration for a laser printer.

FIG. 8 shows an optics configuration consisting of a laser scanner 73 projecting through a lens 75 and mirror 77 onto a scan line across an OPR 79. Depending on the nature of the optics, the size of pixel dots may vary across the scan line. In this case, wide dots, depicted as dot 83 are projected at the edges, and narrow dots, depicted as dot 85 are projected near the center. This is as expected because, even if the scan line is normal to the OPR 79, the dot 83 is projected at a substantial angle to the OPR 79 near the edges of the OPR 79. The result is that instead of being uniformly round, the different pixel dots 83, 85 exhibit aberrations in their shapes.

Figure 9:
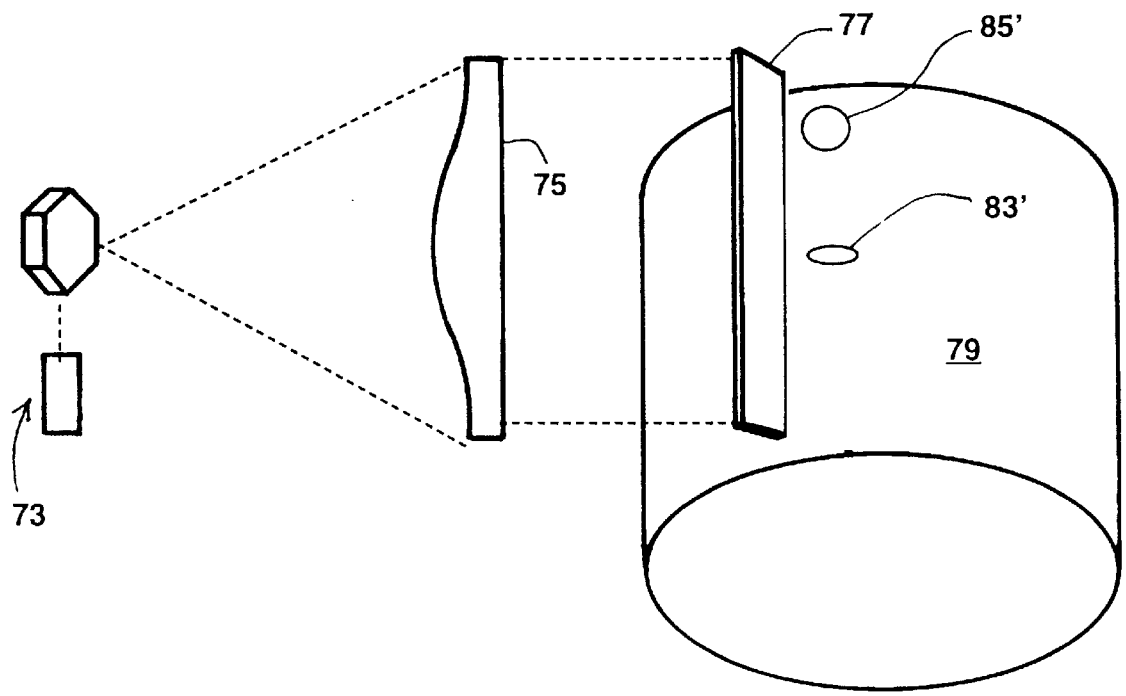
FIG. 9 shows an optics configuration in which the projection of a laser scanner is skewed from normal.

FIG. 9 shows further compensation for distortion in dot shape. In this embodiment, the projection of the laser scanner 73 is skewed from normal to the OPR 79. This results in the scan line being projected at an angle to the surface of the OPR 79, but otherwise nearly parallel to the OPR 11. (The scan line is also slightly skewed with respect to the axis of the OPR in order to synchronize the scan with rotational movement of the OPR and thereby establish a straight line raster pattern.)

As a result of the skewing projection of the scan line at an angle to the surface of the OPR 79, the projection of dots, represented as dots 83' and 85', are made more elongated in the circumferencial direction. The shapes of the different dots 83', 85' are affected by the skewing by these shapes being elongated in a vertical direction; that is about the circumference of the OPR 79.

FIG. 8 shows the unskewed projection of dots 83, 85, and FIG. 9 shows the skewed projection of dots 83', 85'. If the different dots 83, 85 would have different shapes when projected along a straight line normal to the surface of the OPR 79, these shapes would be affected by the skewing substantially equally and dots 83', 85' therefore would still be different from each other. Thus if the unskewed projection of dot 83 were round (which is what is desired), the corresponding skewed projection of dot 83' would be elongated in the circumferencial direction. Likewise if the unskewed projection of dot 85 were flat (wider across the length of the OPR 79 than about the circumference of the OPR), the skewed projection of dot 85' could be round. Therefore, after skewing, the projection, the different pixel dots 83', 85' continue to exhibit aberrations in their shapes.

Of course, the above example assumes similar optics. In any case, by skewing the projection as shown in FIG. 9, it is possible to compensate for width increase at the edge of the OPR 79. The skewing of the projection will result in the dots expanding in the circumferencial direction of a cylindrical OPR.

A preferred configuration of the embodiment of the FIG. 9 anticipates that some of the dots will be expanded in the scan direction (width). The skewing results in a more nearly round projection, represented by dot 85'. This also results in a similar expansion of dots in the vertical direction, as shown by dot 83'. Therefore, if the wide dot made round 85' is now has desired dimensions, the round dot made long 83' needs correction. This is accomplished with adjustments to the pulse width of power to the laser scanner 73.

The pulse width to energize the laser scanner 73 is optimized for dots across the scan line. This requires limiting the pulse width near the edges of the OPR 79 so that those pixels 85' are not too wide. The limited pulse width and the skewing of the projection as shown in FIG. 9 results in those pixels assuming desired dimensions. For the narrow pixels 83' near the center of the OPR 79, the pulse width is extended in order to increase their width. As a result, pixel size is able to be adjusted across the width of the OPR 79 by making pulse width adjustments.

It is possible to use this technique of adjusting pulse width permits adjustments in pixel size regardless of whether the scan line is skewed as shown in FIG. 9. The invention makes it possible to compensate for the location of the pixel in the scan pattern. If a pixel in the center of a scan pattern is too narrow, it is possible to provide additional pulses before and after each pixel near the center. The result is an overlap of depletion areas which conforms to a desired pixel shape. Thus, going back to FIG. 9, the skewing of the projection to an angle from the normal results in reducing the tendency of pixels to be wider across the scan line than they are long, but increases the tendency of pixels to be longer than they are wide.

Figure 10:
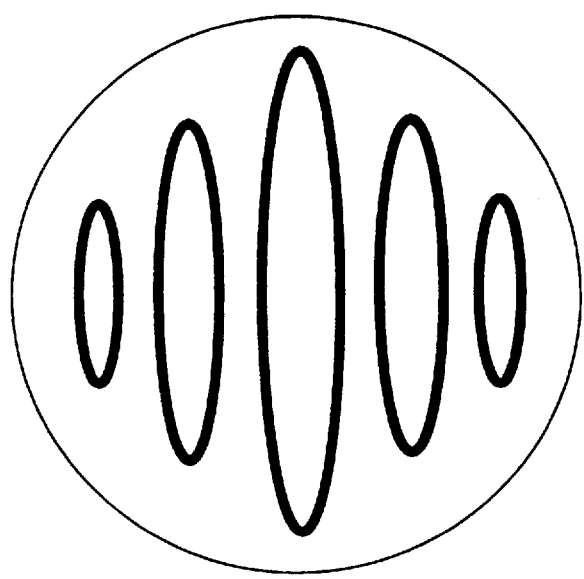
FIG. 10 shows the use of additional pulses of optical energy used to simulate a round dot from a narrow optical projection pattern of a pixel.

In the preferred embodiment, electronic changes in pixel size are made by adjusting pulse with. Short pulses may also be used to simulate a round dot from a narrow optical projection pattern of a pixel, as shown in FIG. 10. This provides a different type of simulation of round pixels, by providing multiple pulses.

The use of the Resolution Enhancement™ technology to selectively expand the charge pattern has been described, but it is also possible to selectively narrow the charge pattern. In this manner, if a pixel occurs in a pattern which is likely to cause excessive regions of imaging, the duration of energy applied to deplete to that pixel can be reduced.

It is also possible to use the inventive techniques on other electronic equipment which provide pixelated images. An example of such equipment would be a wide angle CRTs, in which it is desired to control a scan pattern so as to provide uniformity of imaging between the center and edges. While particularly useful for laser dot matrix printers, the inventive techniques can be used with scan patterns other than dot matrix, and for other types of dot matrix printers. In particular, the invention is useful for laser dot matrix printers which are capable of developing halftone images by reducing development for individual pixels. It is therefore anticipated that the invention should be limited in scope only by the claims.

What is claimed is:

1. A method of laser printing comprising:
   a. pixelating an image from a bit map for printing by resolving the image into a pattern of dots for development;
   b. temporarily storing the resolved image on a FIFO basis without changing a rate at which data is read from the bit map
   c. selecting pixels which require enhancement in order to achieve image uniformity;
   d. applying energy to a laser in accordance with a scan pattern and directing an optical output of the laser in the scan pattern; and
   e. applying additional energy adjacent said selected pixels.

2. A method of laser printing comprising:
   a. pixelating an image for printing by resolving the image into a pattern of dots for development;
   b. establishing patterns of windows of pixels for pixel enhancements;
   c. providing a portion of the pixelated image to a buffer corresponding to a predetermined number of scan lines of pixels;
   d. selecting a scan line on the buffer for logic matching;
   e. grouping each individual pixel in at least a portion of the scan line selected for logic matching with adjacent pixels, thereby establishing a grouped window for each of said individual pixels;
   f. logic matching said grouped windows to the patterns of windows;
   g. using the logic matching of said grouped windows to the patterns of windows to select said individual pixels for enhancement;
   h. incrementing the buffer in order to logic match pixels in a subsequent scan line;
   i. selecting pixels which require enhancement in order to achieve image uniformity;
   j. applying energy to a laser in accordance with a scan pattern and directing an optical output of the laser in the scan pattern; and
   k. applying additional energy adjacent said selected pixels.

3. A method of laser printing as described in claim 2, further comprising:
   said enhancement consisting altering a total time duration of energy application to the laser.

4. A method of laser printing as described in claim 2, further comprising:
   said enhancement consisting altering a pulse length for additional energy application to the laser during imaging the pixel.

5. A method of laser printing as described in claim 2, further comprising:
   said enhancement consisting providing at least one additional pulse of energy to the laser at a location adjacent the selected pixel.

6. A method of laser printing as described in claim 2, further comprising:
   altering said enhancement in accordance with positions of said individual pixels on the scan line.

7. A method of laser printing as described in claim 2, further comprising:
   a. said patterns of windows established for enhancement including selected patterns corresponding to halftone imaging, wherein a developed pixel juxtaposes a plurality of undeveloped pixels; and
   b. providing additional energy when said grouped window matches one of said selected patterns corresponding to halftone imaging.

8. A method of laser printing as described in claim 1, further comprising:
   said enhancement consisting altering a pulse length for additional energy application to the laser during imaging the pixel.

9. A method of laser printing as described in claim 1, further comprising:
   said enhancement consisting providing at least one additional pulse of energy to the laser at a location adjacent the selected pixel.

10. A resolution enhancement circuit for increasing the resolution of an electronic raster scan, the circuit comprising:
    a. an image generator circuit for pixelating an image by resolving the image into a pattern of pixels for development and providing an output signal corresponding to the pattern of pixels;
    b. a drive circuit for driving an image scan device in a scan pattern, the scan pattern corresponding to the pattern of pixels;
    c. a buffer, interposed between the image generator circuit and the drive circuit, for receiving portions of said output signal, temporarily storing the output signal in a temporary bit map, and transmitting the portions to the drive circuit;
    d. a signal processing circuit for sampling patterns in the temporary bit map, grouping each individual pixel in at least a portion of the scan line selected for comparison with adjacent pixels, thereby establishing a grouped window for each of said individual pixels, and providing a modification signal to the buffer to modify the bit map; and
    e. a logic matching circuit for comparing the grouped pixels to predetermined patterns of pixels for enhancement, wherein a developed pixel juxtaposes a plurality of undeveloped pixels, and providing said modification signal, thereby causing the drive circuit to apply additional energy when said grouped window matches one of said predetermined patterns.

11. The resolution enhancement circuit of claim 10, further comprising:
    a. the buffer storing the signals for a predetermined number of scan lines of pixels as a FIFO buffer, the buffer incrementing the scan lines in the buffer upon receipt of successive scan lines; and
    b. the logic matching circuit grouping windows for pixels on each of said scan lines, thereby incrementing the windows as the buffer receives successive scan lines.

12. A method of laser printing comprising:
a. pixelating an image for printing by resolving the image into a pattern of dots for development;
b. establishing patterns of windows of pixels for pixel enhancements;
c. grouping each individual pixel in at least a portion of the pixelated image for logic matching with adjacent pixels, thereby establishing a grouped window for each of said individual pixels;
d. logic matching said grouped windows to the patterns of windows;
e. using the logic matching of said grouped windows to the patterns of windows to select said individual pixels for enhancement;
f. selecting pixels which require enhancement in order to achieve image uniformity;
g. applying energy to a laser in accordance with a s can pattern and directing an optical output of the laser in the scan pattern; and
h. applying additional energy adjacent said selected pixels.

13. A method of laser printing as described in claim 12, further comprising:
said enhancement consisting altering a total time duration of energy application to the laser.

14. A method of laser printing as described in claim 12, further comprising:
said enhancement consisting altering a pulse length for additional energy application to the laser during imaging the pixel.

15. A method of laser printing as described in claim 12, further comprising:
said enhancement consisting providing at least one additional pulse of energy to the laser at a location adjacent the selected pixel.

16. A method of laser printing as described in claim 12, further comprising:
altering said enhancement in accordance with positions of said individual pixels on the scan line.

* * * * *